Dec. 12, 1961
R. G. RUSSELL
3,013,095
METHOD AND APPARATUS FOR MELTING AND FEEDING
HEAT-SOFTENABLE MATERIALS
Filed Dec. 30, 1957
4 Sheets-Sheet 1
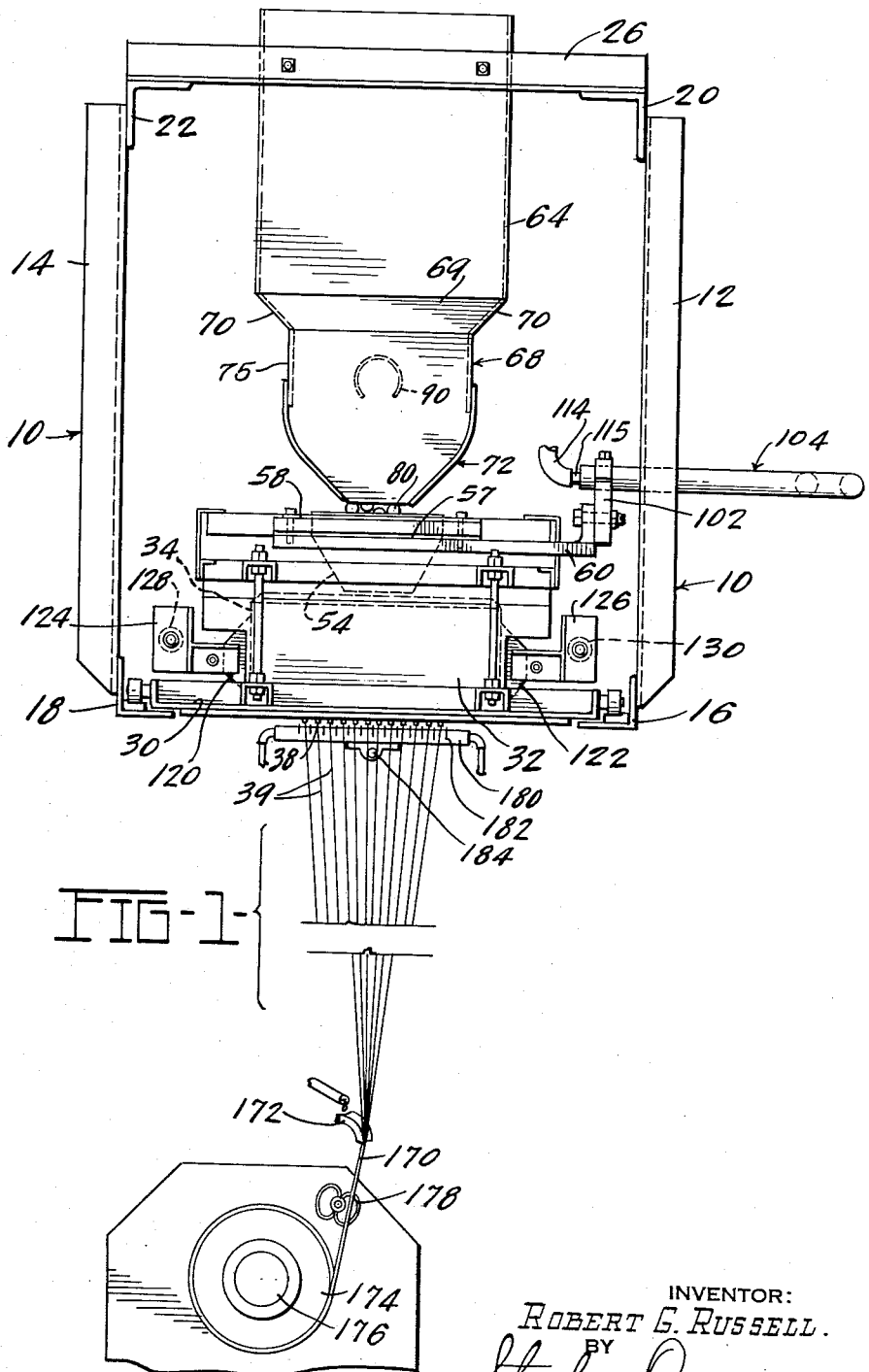
INVENTOR:
ROBERT G. RUSSELL.
BY
ATTORNEYS.

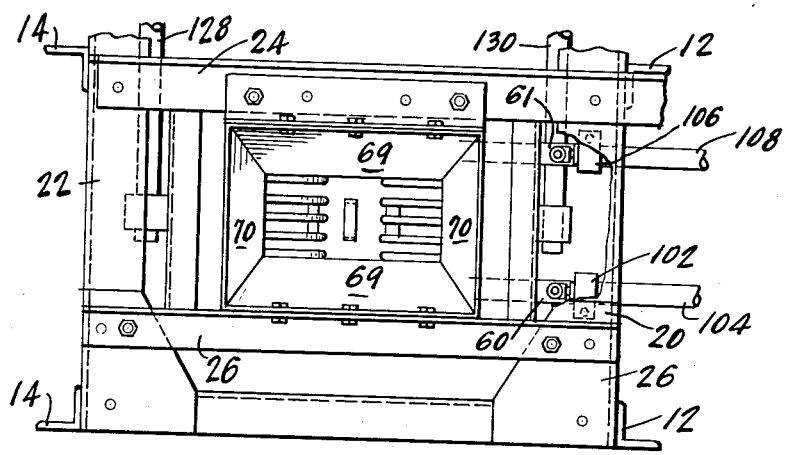
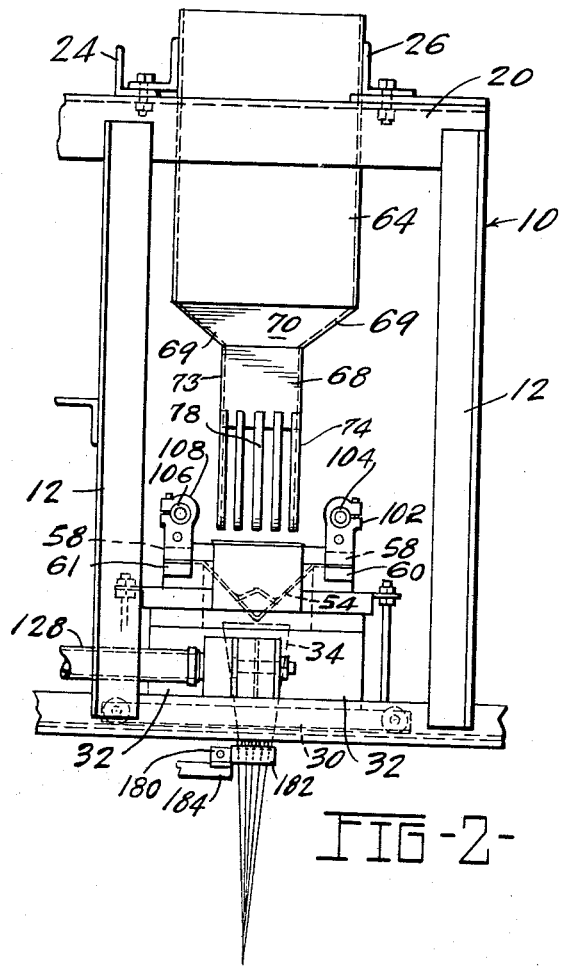

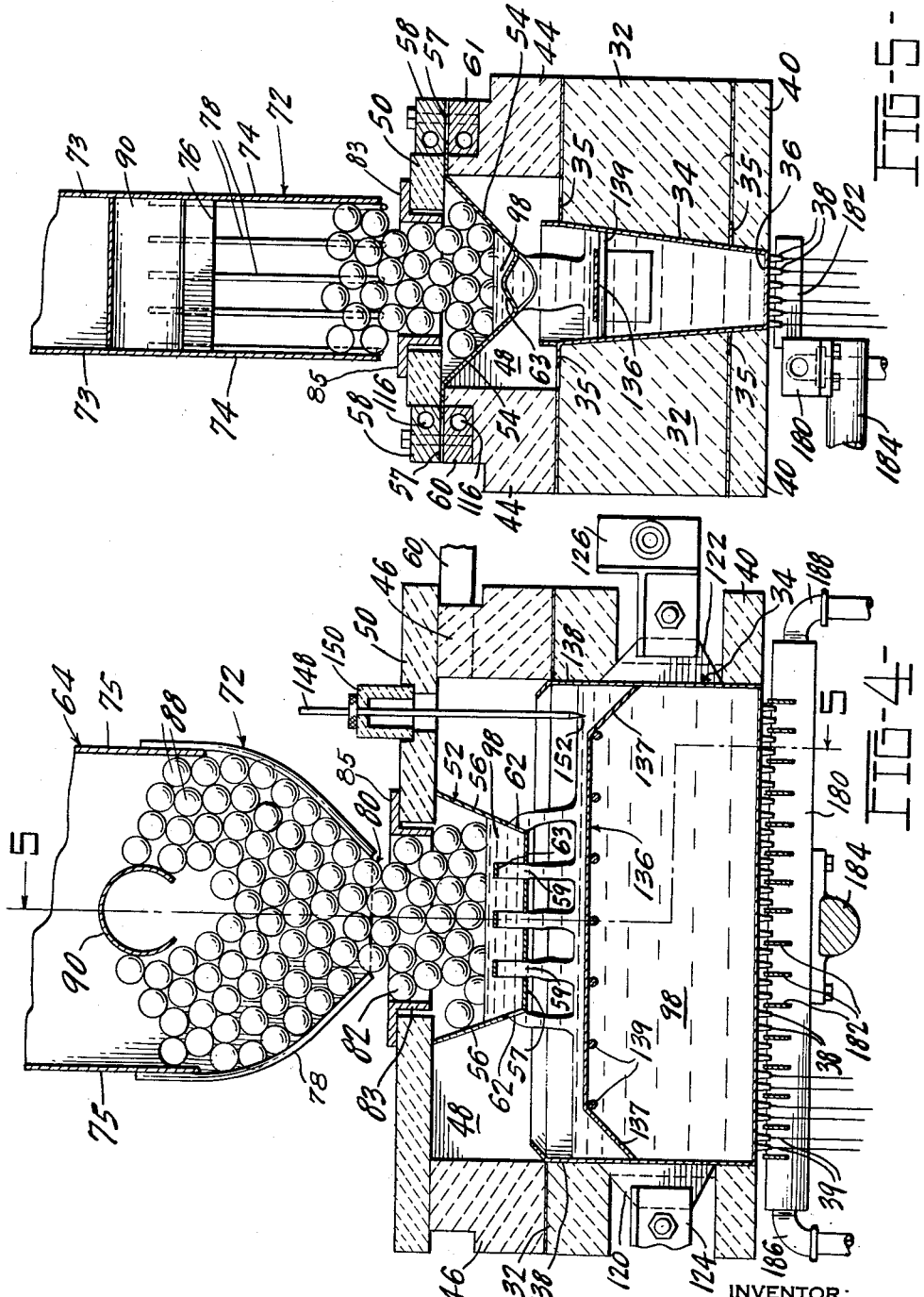

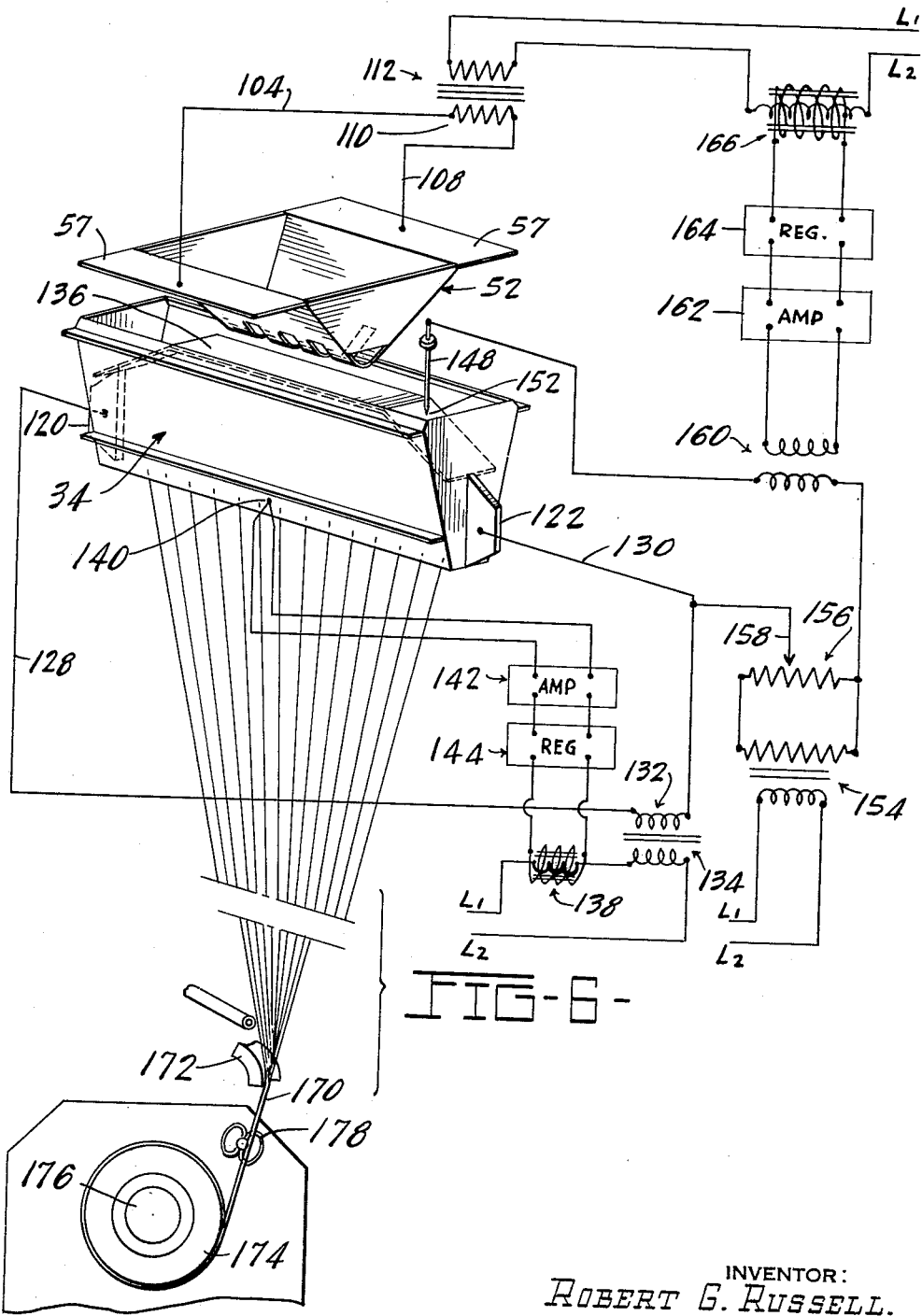
FIG-6-

United States Patent Office 3,013,095
Patented Dec. 12, 1961

3,013,095
METHOD AND APPARATUS FOR MELTING AND FEEDING HEAT-SOFTENABLE MATERIALS
Robert G. Russell, Granville, Ohio, assignor to Owens-Corning Fiberglas Corporation, a corporation of Delaware
Filed Dec. 30, 1957, Ser. No. 706,027
7 Claims. (Cl. 13—6)

This invention relates to a method of and apparatus for melting heat-softenable materials and for delivering or discharging streams of the material and more particularly to an arrangement for preheating and melting heat-softenable mineral materials such as glass and flowing streams of the conditioned or molten material which may be attenuated to linear bodies, filaments or fibers particularly usable in the fabrication of strands or yarns for textile purposes.

In the manufacture of textiles formed of strands, yarns or threads of glass fibers or filaments, the fibers or filaments must be of substantially uniform size and character in order that commercially acceptable textiles may be produced. The glass or mineral material employed in forming filaments for textile uses must be highly refined and of homogeneous character. To attain high quality glass usable for this purpose, the glass batch is melted, fined and refined in a comparatively large furnace containing many tons of glass until the molten glass is free of seeds, cords, stria and impurities which would impair the quality of the glass. The refined glass from such furnace is fashioned or molded into pieces or cullet preferably in the shape of small spheres or marbles which are resoftened for forming textile filaments.

Heretofore the marbles have been delivered individually directly into a feeder or bushing which is supplied with electric current to remelt or soften the marbles to a flowable condition and the softened glass discharged through orifices in a bottom wall of the feeder in a plurality of streams which are attenuated to filaments by mechanical means.

Heretofore the marbles have been delivered individually and periodically by mechanical gating means through a chute into the electrically heated feeder. The molten glass in the feeder is at a temperature of upwards of 2300° F. or more while the marbles introduced into the feeder are at room temperature. A major difficulty in forming filaments by attenuating streams of glass is to maintain the glass of the streams at a substantially constant viscosity and temperature.

A deviation of a few degrees in the temperature of the glass in the feeder changes its viscosity and results in variations in the size or character of the filaments formed from the streams. As each relatively cold marble or piece of glass is delivered into a feeder, it causes an immediate temperature change or thermal shock in the molten glass in the feeder. The delivery of each marble into the molten glass in the feeder effects a sufficient change in the viscosity to temporarily modify the size of the filaments formed from the streams.

The thermal shock or rapid temperature change is accentuated where a large number of streams are flowed continuously from a feeder which necessitates successive delivery of individual marbles at comparatively short intervals, a condition which causes a continuous fluctuation in the viscosity of the molten glass in the feeder and hence the viscosity of the streams.

The present invention embraces the provision of a method for reducing heat-softenable mineral material such as glass to a flowable condition and maintaining the material at a required condition of flowability in a feeder zone during the delivery of the relatively cold glass into a melting zone without transmitting thermal shock to or materially modifying the viscosity of the glass in the feeder zone.

An object of the invention is the provision of a method involving the steps of delivering preheated solid bodies of heat-softenable mineral material into a zone in which the preheated bodies are reduced to a molten or flowable state and the molten material delivered into a second zone in which heat is applied to maintain the material in the second zone at a substantially constant viscosity whereby streams of material of uniform character may be delivered from the second zone.

Another object of the invention embraces a method of preheating solid pieces of fiber-forming mineral material in and adjacent a chamber or zone at which heat is applied to reduce the pieces of material to a molten state, the molten material flowed into a second chamber and the requisite quantity of material maintained in the second chamber by controlling the temperature of the material in the first chamber to thereby regulate and control the rate of flow or delivery of the material from the first chamber into the second chamber.

An object of the invention resides in an apparatus embodying two chambers or zones, one of which is adapted to receive solid pieces of heat-softenable material and heat applied to reduce the solid pieces to molten condition, and the molten material delivered into the second chamber and heat applied to maintain the molten material at a viscosity suitable for flowing streams of uniform character from the second chamber.

Another object of the invention resides in the provision of an apparatus wherein solid marbles or pieces of refined glass contained in a hopper or supply magazine whereby the marbles or pieces are preheated by heat from a chamber into which the marbles or pieces are delivered for reduction to a molten condition.

Still another object of the invention is the provision of a premelting chamber and a feeder chamber in combination with heating means for reducing the pieces of heat-softenable material to a molten condition in the first chamber and flowing the molten material into the second chamber, the arrangement including means for controlling the application of heat to the melting chamber and thereby regulate the flow rate of material into the second chamber.

Another object of the invention resides in the provision of an apparatus wherein marbles or pieces of refined glass are handled in bulk in a hopper and are delivered to a melting chamber as required by the rate of withdrawal of molten glass without the use of special marble chutes and mechanical feeding devices.

Another object of the invention resides in a material melting and feeding apparatus embodying a material preheating zone and a feeder zone, both zones being heated by electric energy and control exercised over the temperature of the material in the zones.

Another object of the invention is the provision of a method of control of the melting rate of glass in a melting zone correlated with the rate of delivery of the molten glass from a feeder zone whereby to regulate the rate of melting of the glass dependent upon the rate of delivery of the molten glass from the feeder zone.

Another object of the invention is the provision of an apparatus for controlling the delivery of molten glass or other mineral material into a feeder by varying the viscosity of molten glass in a melting zone disposed adjacent the feeder.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a front elevational view of an apparatus embodying the invention particularly usable for conditioning fiber-forming material from which filaments or fibers may be formed;

FIGURE 2 is a side elevational view of the structure shown in FIGURE 1;

FIGURE 3 is a top plan view of the apparatus;

FIGURE 4 is a longitudinal vertical sectional view showing the material supply means, a material melting zone or compartment and a feeder for delivering streams of the material;

FIGURE 5 is a transverse sectional view taken substantially on the line 5—5 of FIGURE 4, and FIGURE 6 is a schematic view illustrating the melting zone, the material feeding zone and the electrical circuits and controls.

While the method and apparatus of the invention have particular utility in processing and conditioning glass for forming textile filaments, it is to be understood that the method and apparatus of the invention may be utilized for conditioning and processing other mineral materials or wherever an accurate control of the rate of melting and feeding heat-softenable material is desired.

Referring to the drawings in detail and initially to FIGURES 1, 2 and 3, a form of apparatus is illustrated which is particularly adaptable for forming fine filaments of glass for use in fabricating textiles. The apparatus is supported upon a suitable frame 10 which may be mounted upon structural members (not shown) of a building or room in which the apparatus is installed. The frame 10 is inclusive of pairs of vertically disposed struts or beams 12 and 14 which are connected at their lower ends with horizontally disposed beams 16 and 18. The upper ends of the struts 12 and 14 are joined to beams 20 and 22 and the latter secured to longitudinally extending beams 24 and 26.

The frame 10 provides a support for the feeder or bushing, the material melting chamber and a hopper means adapted to contain a supply of pieces or bodies of heat-softenable material. Disposed adjacent the members 16 and 18 is a supplemental frame or member 30 which supports a pair of blocks or members 32 formed of high temperature refractory. The members 32 are shaped to accommodate a feeder or bushing 34 formed of high temperature resistant metal such as platinum rhodium or other material capable of withstanding high temperatures.

The floor or bottom wall 36 of the feeder or bushing 34 is provided with a plurality of projections or tips 38 formed with orifices or openings through which heat-softened material such as glass in the feeder 34 is discharged in a plurality of streams. Disposed beneath the members 32 are plates 40 of refractory which are directly engaged by the frame member 30 for supporting the bushing and associated elements. As shown in FIGURES 1 and 4, the feeder or bushing 34 is of elongated shape, the side walls thereof being disposed in generally converging relation as illustrated in FIGURE 5 and having lateral flanges 35 engaging the members 32 and 40 for supporting the feeder.

Means is provided for reducing the mineral material to a softened or molten state, whereby the molten material is delivered into the feeder or bushing 34 at a temperature approaching or approximating the temperature of the material in the feeder in order to eliminate or minimize thermal shock to the molten material in the feeder. Mounted upon the blocks or members 32 is a pair of blocks 44, extending lengthwise of the feeder or bushing 34, and a second pair of blocks 46 extending transversely and forming with the blocks 44 a chamber or space 48.

The blocks 44 and 46 support a plate 50 of refractory which forms a ceiling or closure for the space 48. Disposed in the space 48 is a member 52 formed of platinum rhodium or other material capable of withstanding high temperatures. As shown in FIGURES 4 and 5, the member 52 is of generally triangular cross-section in a transverse direction provided with converging side walls 54 and canted end walls 56.

The side walls 54 are provided with planar extensions 57 which are engaged by metal current conductors or bus bars 60 and 61 arranged to conduct electrical energy to the member 52 providing heat for reducing the solid pieces of mineral material to a molten or flowable condition in the melting zone or chamber 52. The extensions 57 of the melting receptacle 52 are held in engagement with the bus bars by means of clamp bars or members 58.

Supported upon the members 26 of the frame 10 is a hopper or receptacle 64 adapted to contain a supply of glass cullet or marbles, the upper region of which is substantially rectangular in cross-section as shown in FIGURE 3. The comparatively large upper region of the hopper terminates in a portion 68 of reduced cross-sectional area which is joined with the upper portion by convergingly arranged pairs of walls 69 and 70, as shown in FIGURES 1 through 3. Through this construction a major portion of the marble load is borne by the walls 69 and 70.

Extending beneath the portion 68 is a cage-like means 72, the side walls 74 of the cage being formed as continuations of the side walls 73 of the portion 68.

Secured to the lower end region of each of the walls 75 of portion 68 is a group of transversely spaced rods or bars 78, the groups of bars being convergent and defining with the walls 74 a marble discharge port or delivery region 80. The discharge region 80 is in registration with a rectangularly shaped passage 82 provided in a member 83, the latter being formed with a sleeve portion extending through an opening in the plate or member 50.

The member 83 is formed with an outwardly extending flange or ledge 85 which engages the upper surface of the plate 50 to position the member 83. The cullet or marbles 88 move through the passage 82 by gravity into the melting chamber defined by the member 52.

The bars 78 forming the means for guiding the marbles into the melting chamber 52 are spaced sufficiently close to one another so that the widths of the spaces between successive bars are less than the diameters of the pieces of mineral material to prevent passage of the marbles or cullet through the spaces between adjacent bars.

The spaces between adjacent bars provide for the escape of volatiles or gases that may be given off from the glass during its reduction to a softened or molten state within the chamber 52. Extending transversely across the hopper 64 is a cylindrically shaped element or baffle 90 which forms an obstruction across the hopper chamber to prevent the marbles 88 "bridging" across the hopper and impeding the movement of marbles into the melting chamber. It is to be understood that other forms of baffle means may be utilized in the hopper to accomplish the purpose.

The softening or reduction of the marbles to flowable or molten condition occurs in the melting chamber 52 by heat generated by flow of electric current through the walls of the member 52. The bus bars 60 and 61 are supplied with current by circuit means hereinafter described from a power transformer shown diagrammatically at 112 in FIGURE 6, which is supported by extensions (not shown) of the frame structure 10. The resistance to current flow through the walls of the melting chamber 52 provides heat for softening or melting the marbles 88.

The bottom wall 57 of the melting chamber 52 is formed with orifices 59 through which the molten glass flows into the feeder 34. Each apex region of the end walls 56 of the melting chamber is provided with an orifice 62 through which the molten material is also discharged from the melting chamber.

The orifices 59 are formed in the floor or bottom wall 57 of the melting chamber 52 by slitting the material at the converging or apex regions of the side walls 54, and bending or pressing the metal between adjacent slits upwardly providing bridge-like strips 63 as shown in FIGURES 4 and 5. By elevating the strips 63, passages, outlets or orifices 59 are established whereby the molten material 98 may flow from the melting chamber 52 into the feeder 34.

It should be noted from FIGURE 5 that the bridges or strips 63 extend in the direction of current flow through the walls of the chamber 52 to provide a metallic path for the electrical current whereby the current may flow in a metallic path without abrupt deviation from its normal linear flow from a bus bar at one side of the melting chamber to the bus bar on the opposite side of the chamber.

This is an important feature in that this method of forming the orifices 59 presents a minimum of obstruction to current flow as the strips 63 provide a path of least resistance, to facilitate current flow through the melting chamber. By regulating the flow of electric current through the melting chamber 52, the rate of melting the solid marbles or cullet 88 may be effectively and accurately controlled.

As will be seen from FIGURES 4 and 5, the glass in a molten state, indicated at 98, flows downwardly through the orifices 59 and 62 into the feeder 34. The melting rate is controlled by means hereinafter described to maintain a desired level of molten glass in the upper region of the feeder to maintain a constant head of molten glass therein. The temperature of the glass in the feeder is preferably slightly above the temperature at which it flows into the feeder and is maintained at the proper temperature in the feeder by means of electric current in a circuit independent of the circuit supplying electric energy to the melting chamber 52.

Electrical energy or current is supplied to the melting receptacle 52 through the bus bars 60 and 61 connected therewith. The bus bar 60 is provided with a terminal clamp 102 which is connected with a current supply conductor 104 while the bus bar 61 is equipped with a terminal 106 which is connected with a current conductor 108. The current conductors 104 and 108 are preferably in the form of tubes formed of copper bearing metal or other metal having high current conductivity characteristics and are connected with the secondary 110 of the power transformer 112 as illustrated diagrammatically in FIGURE 6.

The tubular current conductors 104 and 108 are adapted to accommodate a circulating cooling fluid, such as water, to maintain the current conductors at safe operating temperatures. As shown in FIGURE 1, a water supply conduit 114 formed of rubber or the like is connected to a fitting 115 provided at the end regions of each of the current conductors for conveying cooling fluid to the current conductors. As shown in FIGURE 5, the bus bar constructions 60 and 61 and the clamp bars 58 may be fashioned with longitudinally extending passages 116 to accommodate a circulating cooling fluid such as water in order to maintain these components at safe operating temperatures.

The bushing or feeder 34 adapted to receive molten glass or other material from the foremelter or premelter 52 is electrically heated. The feeder is formed of high temperature resistant metal or alloy such as platinum rhodium or other suitable material, the end regions of which are provided respectively with connector terminals 120 and 122. As shown in FIGURES 1 and 4, there is secured to terminal 120 a clamp or connector coupling 124 and a similar clamp or coupling 126 is secured to the terminal 122. The connectors or clamps 124 and 126 are respectively connected by means of current conductors 128 and 130, shown in FIGURES 2, 3 and 6 with a secondary 132 of a power transformer 134 to maintain the glass or other material within the bushing at the proper temperature and viscosity.

In order to provide for a highly heated zone at the region of entrance of the molten glass into the feeder 34, a metallic heater strip 136 extends preferably lengthwise of the feeder as shown in FIGURES 4 and 5 and has its end regions 137 welded or otherwise secured to the end walls 138 of the feeder. A plurality of transversely extending rods or bars 139 of high temperature resistant metal disposed between the side walls of the feeder are adapted to support the heater strip 136 in the manner shown in FIGURES 4 and 5.

The heater strip 136 is immersed in the molten glass preferably just beneath the normal level thereof in the feeder 34. As the strip 136 provides a direct metallic path from one end wall of the feeder to the other, the region of the glass adjacent the strip will be highly heated so that the temperature of the glass at its region of entry from the premelter 52 into the feeder 34 is quickly brought up to the temperature at which the glass is maintained in the feeder.

The components for controlling the current supplied to the premelter 52 and the bushing 34 and the means for maintaining a substantially constant level or head of glass or other molten material in the feeder 34 are illustrated diagrammatically in FIGURE 6. In this arrangement, the current supply circuit to the bushing 34 from the transformer 134 is independent of the current supply circuit to the premelter or foremelter 52. The transformer 134 shown diagrammatically in FIGURE 6 may be supported upon extensions (not shown) of the frame construction illustrated in FIGURES 1, 2 and 3.

The heating current for the feeder or bushing 34 supplied to the transformer 134 from a source of power or supply line by means of conductors L1 and L2. The power source, for example, may be a 440 volt, 60 cycle alternating current. The transformer 134 reduces the voltage in the secondary 132 for example, to a value in the order of 2 volts, and the secondary provides heating current in the order of one or more kilo-amperes.

The primary circuit of the transformer 134 includes a saturable core reactor 138 which functions as a variable impedance to provide adjustment of the current flow through the feeder 34 to secure the desired temperature for the material in the feeder. The saturable core reactor 138 is cooperatively associated with a thermocouple 140 secured to a side wall of the feeder 34 as diagrammatically illustrated in FIGURE 6 and functions to sense or monitor an electrical signal corresponding to the feeder temperature.

The thermocouple 140 is in circuit with an amplifier 142 which amplifies the temperature signal supplied from the thermocouple to a regulator 144, the latter supplying direct current to the saturable core reactor 138 which modifies the impedance in the primary circuit of the transformer 134 to automatically maintain a fixed feeder temperature. The regulator 144 is adjustable to facilitate selection of the temperature at which the feeder is to be maintained. When the temperature of the feeder 34 tends to rise above the preselected temperature, direct current supplied from the regulator 142 to the saturable core reactor 138 is reduced, thereby increasing the impedance and diminishing the current flow in the secondary circuit 132 connected with the feeder.

Should the temperature of the feeder tend to fall below the preselected temperature, the regulator 144 functions to increase the direct current delivered to the reactor 138, thereby reducing the reactor impedance and increasing the current flow in the secondary circuit and increase the temperature in the feeder. Through this arrangement, the temperature of the material in the feeder is maintained substantially constant regardless of the rate of withdrawal of the molten material through the orifices 38 formed in the bottom wall or floor of the feeder.

As the molten material in the feeder is discharged or delivered through the orifices, the supply in the feeder is replenished from molten material supplied from the premelter or foremelter chamber or unit 52. The heating current is supplied to the premelter or foremelter 52 through the transformer 112 which is connected with a power line or source by the conductors L1 and L2.

The rate of flow or delivery of the marbles or cullet 88 from the hopper 64 is dependent upon the rate of melting or reduction of the marbles to molten condition in the melting chamber 52. Thus the more current flowing through the melting unit 52, the faster the rate of flow of the molten material from the melting chamber 52 into the feeder 34, and, correspondingly, the rate of delivery of marbles is increased from the hopper into the premelter 52.

The arrangement illustrated in FIGURE 6 includes electrical controls whereby the rate of delivery of the molten material from the melting chamber 52 into the feeder is matched or coordinated to the rate of withdrawal or delivery of molten material from the feeder. This control is established by continuous modulation provided by a glass level-control circuit which regulates the current flow to the melting chamber 52 and hence regulates the melting rate of the cullet or marbles in the chamber 52.

The control circuit is inclusive of a probe bar or member 148 which is insulatingly supported by an element 150 carried by the plate 50 as shown in FIGURE 4 and is vertically adjustable to a desired position relative to the level of the glass or material in the feeder. The probe bar 148 has a tapered extremity 152 in contact with the surface region of the molten material in the feeder 134 as illustrated in FIGURE 4. A difference in potential is established between the probe bar 148 and the material in the feeder 34 by electrical connections to a transformer 154 through a voltage divider 156.

The transformer 154 is connected to a current supply line L1, L2 and provides the secondary circuit with a relatively low voltage to the voltage divider 156. The adjustable member 158 of the voltage divider facilitates selection of the voltage applied across the feeder and material contained therein through the terminal 122 and the probe 148. A coupling transformer 160 in circuit with the probe 148 impresses a current signal from the probe circuit to an amplifier 162 which transmits the amplified current signal to a regulator 164.

The regulator 164 is in circuit with a saturable core reactor 166 in the primary circuit of the transformer 112 which supplies current to the premelter 52. The amplifiers 142 and 162 and the regulators 144 and 164 are of conventional construction. The function of the amplifier 162 and regulator 164 is to transfer an amplified probe current signal which will constantly monitor or regulate the flow of current through the premelter 52 to replenish the molten material discharged from the feeder 34.

It has been found that variations in depth of a probe from a point at which contact is completed with the surface of the molten body of glass in the feeder to a slight depth can be utilized to effect sufficient variation in contact resistance and current in the probe circuit corresponding to a range of glass levels in the feeder so that the current in the probe circuit may be employed as an index of the glass level and to regulate such level.

Thus, a desired level of glass in the feeder can be preselected by adjustment in the regulator 164 to establish a predetermined current flow in the probe circuit as a standard. The taper 152 of the probe 148 provides for substantial variations in the area of contact with the glass upon minute differentials in the level of the glass which provides a correspondingly greater variation in resistance or degree of contact with the molten glass for variations in the glass level. A cylindrical probe may be utilized but with less sensitivity than the tapered extremity or cone 152 of the probe shown in the drawings.

In the operation of the glass level control arrangement, the probe 148 is mounted with the tapered portion 152 extending to a depth of about one thirty-second of an inch below the surface of the molten glass in the feeder at the desired level that is to be maintained. The current flow in the probe circuit at a predetermined fixed position for the probe is established as a standard current value, and variations in current value due to variations in the level of the glass act through the regulator 164 to modify the current flow in the premelter 52.

If the level of the glass in the feeder exceeds the standard, then current flow in the probe circuit increases proportionately to the rise in level of the glass. The increased current flow is amplified by the amplifier 162 and the output supplied to the regulator which functions to supply a proportionately decreased direct current to the saturable core reactor 166 increasing the impedance in the circuit of the premelter 52.

The temperature of the premelter is thus proportionately reduced which effects an increase in the vicosity of the heat-softened glass in the premelter and consequently reduces the flow rate of molten glass into the feeder 34. This results in lowering the level of the glass in the feeder 34 until the standard desired level is reestablished.

Should the level of the glass in the feeder 34 fall below the selected standard, the resistance in the probe circuit is proportionately decreased corresponding to the extent of drop in the glass level.

The current in the probe circuit and the amplified current signal supplied to the regulator 164 is reduced, causing a proportional increase in direct current supply to the saturable core reactor 166 which influences the primary circuit of the transformer 112 allowing proportionately more current to flow through the premelter 52.

The increased current flow increases the temperature and melting rate and decreases the viscosity whereby an increased quantity of glass flows from the premelter into the feeder until the standard level is attained in the feeder. Through the arrangement above described, the level of the glass in the feeder is automatically maintained within a narrow range so that a substantially constant head of molten glass is contained within the feeder 34.

The orifice tips 38 are substantially heated uniformly throughout the length and width of the floor of the feeder by reason of the current flow through the floor of the feeder.

Thus the molten glass in the region orifices is of substantially uniform viscosity whereby the streams 39 delivered from the orifices are substantially uniform. It has been found that it is advantageous to maintain the molten glass in the bottom region of the feeder at a lower viscosity and hence a more fluid condition than the streams below the orifices, particularly when the streams are drawn out or attenuated to form fine continuous glass filaments. By maintaining the glass flowing through the orifice in a highly fluid state, more uniform streams are formed.

As shown in FIGURES 1 and 6, one use of the feeder arrangement is to form fine filaments by mechanical attenuation. The filaments attenuated from the streams are gathered into a sliver or strand 170 by means of a gathering device 172 and the strand collected by winding the same upon a sleeve 174 to form a strand package, the sleeve being rotatably mounted upon a shaft 176 driven by a suitable means (not shown). A traverse means 178 shown in FIGURE 6 may be utilized to distribute the strand lengthwise of the sleeve 174.

In forming filaments from the streams 39, the viscosity characteristics of the glass must be maintained and hence it is desirable to slightly increase the viscosity of the streams by reducing the temperature at a region just beneath the feeder 34 to effect satisfactory attenuation of the streams. To accomplish this purpose, a tubular member 180 is disposed substantially parallel with the feeder 34 and is equipped with thin metal fins or projections 182 extending transversely of the feeder, a fin preferably extending between each two groups of transversely aligned orifices in the manner shown in FIGURES 4 and 5.

The member 180 is mounted upon a suitable bar 184 which is supported by means (not shown). The member 180 is of tubular configuration and is equipped at its ends with fittings 186 and 188 for conveying cooling fluid such as water through the member 180. Some of the heat from the streams of glass 39 is conveyed away from the streams by the fins 182 to the member 180 and transferred to the circulating liquid in the member 180. Through this arrangement, the viscosity of the streams 39 may be increased.

While the glass moving through the orifices in the feeder is of a low viscosity, the transfer of heat from the streams as they move downwardly to the fins 182 provides more viscous streams from which the filaments are attenuated.

The arrangement above described provides for the melting of glass marbles or cullet in a melting chamber disposed adjacent a feeder but arranged whereby the delivery of marbles or cullet 88 into the melter does not affect the temperature and viscosity of the molten glass in the feeder 34. Furthermore, heat from the premelter chamber 52 and the heated marbles is transferred by convection and radiation to the glass bodies or marbles 88 immediately above the premelter and in the lower region of the hopper whereby the temperature of the marbles is progressively increased as the marbles approach the region at which they are melted in the premelter 52.

In this manner, especially high heat efficiency in the reduction of the marbles to a molten state is attained with a minimum of variations in the temperature within the melting chamber 52. Through this arrangement a constant heat of molten glass or other material is maintained in the feeder 34 and molten glass is supplied to the feeder from a melting zone without thermal shock to the glass in the feeder and at the same rate the material is discharged therefrom through orifices by controlling automatically the melting rate in the melting chamber 52.

Through this arrangement the feed of the marbles through the thermal control of the melting rate obviates the use of mechanical marble gating means and marble chutes and automatically maintains accurate control of the glass level in the feeder to provide a constant head of molten glass in the feeder.

It is apparent that, within the scope of the invention, modifications and different arrangements may be made other than is herein disclosed, and the present disclosure is illustrative merely, the invention comprehending all variations thereof.

I claim:

1. Apparatus of the character disclosed, in combination, a melting chamber having passages formed in a wall thereof and adapted to reduce heat-softenable mineral material to a flowable condition, means adapted to contain a supply of pieces of mineral material to be delivered into the chamber at a rate dependent upon the rate of reduction of the material in the chamber to a flowable condition, said melting chamber supporting the pieces of material of the supply, means for applying heat to the pieces of mineral material in the chamber to reduce the material to flowable condition, a feeder disposed beneath and spaced from the chamber adapted to receive streams of the flowable material flowing through the passages in the chamber wall, said feeder being formed with orifices in a wall thereof through which material flows from the feeder in a plurality of streams, means independent of the heating means for the melting chamber for applying heat to the material in the feeder to maintain the material in a flowable condition, and automatically actuated means dependent upon the level of the molten material in the feeder for controlling the application of heat to the material in the chamber to modify the viscosity of the material in the chamber and thereby regulate its rate of delivery into the feeder.

2. Apparatus of the character disclosed, in combination, a melting chamber formed of metal, a feeder chamber spaced from and disposed beneath the melting chamber, means for maintaining a supply of heat-softenable mineral material adjacent the melting chamber whereby the material of the supply is supported by material in the melting chamber, means for applying electric current to the melting chamber to render the material flowable, passage means formed in a wall of the melting chamber for flowing streams of heat-softened material from the melting chamber into the feeder chamber, metal means bridging said passage means providing a path for the current adjacent the passage means, a wall of the feeder chamber being formed with orifices through which flows the heat-softened material in a plurality of streams, including a brake circuit means responsive to the level of the molten material in the feeder chamber for controlling the current flow to the melting chamber for regulating the viscosity of the heat-softened material therein to vary the rate of flow of the material into the feeder chamber.

3. The method of processing heat-softenable mineral material, including maintaining a bulk supply of solid pieces of mineral material supported by material in a melting chamber, flowing streams of the material vertically from the melting chamber into a feeder chamber disposed beneath and spaced from the melting chamber, applying electric current for heating the material in the melting chamber to reduce the solid pieces therein to a flowable condition, applying heat to the material in the feeder independently of the application of heat to the melting chamber to maintain the material in the feeder in a flowable state, and varying the electric current supplied to the melting chamber in accordance with variations of the level of the material in the feeder for controlling the melting rate of the pieces of mineral material in the melting chamber, and continuously replenishing the material in the melting chamber from the bulk supply as streams of molten material in the melting chamber are delivered into the feeder chamber.

4. The method of processing heat-softenable mineral material including maintaining a bulk supply of solid pieces of material supported by material in a first chamber, flowing electric current to the first chamber for melting pieces of material in the first chamber, flowing streams of the molten material from the first chamber into a second chamber spaced from and beneath the first chamber, flowing electric current through the second chamber independently of the current flow to the first chamber, controlling current flow to the second chamber to maintain substantially constant the viscosity of the molten material in the second chamber, varying current flow in a probe circuit dependent upon the relation between a probe and the level of the molten material in the second chamber, transmitting variations in current flow in the probe circuit to a control medium, and varying current flow to the first chamber through the control medium in accordance with variations of current flow in the probe circuit established by variations in the level of the molten material in the second chamber, and flowing streams of the material from the second chamber through orifices in a wall of the second chamber.

5. Apparatus of the character disclosed, in combination, a melting chamber, a feeder chamber independent of the melting chamber and disposed beneath and spaced from the melting chamber, a hopper disposed above the melting chamber arranged to contain a supply of pieces of glass whereby the supply is supported by the melting chamber, a first circuit for supplying electric energy to the melting chamber to render the glass flowable, passage means formed in a wall of the melting chamber for flowing sterams of molten glass into the feeder chamber, a bottom wall of the feeder chamber being formed with orifices through which streams of molten material are discharged from the feeder chamber, a metal strip extending across the feeder chamber, a second circuit independent of the first circuit for supplying electric current to the feeder chamber and strip for maintaining substantially constant the viscosity of the glass in the feeder chamber, a control circuit including a probe arranged to extend into the molten glass in the feeder chamber, and means intercalated in the control circuit associated with said first circuit and responsive to variations in the level of the molten glass in the feeder chamber for varying automatically the current supplied to the first circuit for controlling the rate of melting of material in the melting chamber.

6. Apparatus for processing heat-softenable mineral material including a melting chamber, a feeder chamber disposed beneath and spaced from the melting chamber, said melting chamber being arranged to support a bulk supply of pieces of mineral material and for melting the material, the feeder chamber having a bottom wall provided with orifices through which molten material is discharged from the feeder chamber, said melting chamber being spaced a substantial distance above the level of the molten material in the feeder chamber and having passage means formed in the wall thereof through which the streams of molten material flow into the feeder chamber, a first electric circuit for flowing current through the melting chamber, a second electric circuit independent of the first circuit for flowing electric current through the feeder chamber, a control circuit, and means responsive to variations in the control circuit influenced by variations in the amount of material in the feeder chamber for varying current flow to the melting chamber to regulate the rate of melting of the material in the melting chamber.

7. The method of processing heat-softenable mineral material including maintaining a bulk supply of solid pieces of material supported by material in a first chamber, flowing electric current to the first chamber for melting pieces of material in the first chamber, flowing streams of the molten material from the first chamber into a second chamber spaced from and beneath the first chamber, flowing electric current through the second chamber independently of the current flow to the first chamber, controlling current flow to the second chamber to maintain substantially constant the viscosity of the molten material in the second chamber, varying current flow in a control circuit responsive to variations in the level of the molten material in the second chamber, transmitting current variations in the control circuit to a current regulator, and varying current flow to the first chamber by the current regulator.

References Cited in the file of this patent

UNITED STATES PATENTS

| 1,954,732 | Gossler | Apr. 10, 1934 |
| 2,397,852 | Gentil | Apr. 2, 1946 |
| 2,465,283 | Schlehr | Mar. 22, 1949 |
| 2,485,851 | Stevens | Oct. 25, 1949 |
| 2,596,272 | Moravec | May 13, 1952 |
| 2,618,906 | Hess | Nov. 25, 1952 |
| 2,634,553 | Russell | Apr. 14, 1953 |
| 2,692,296 | De Iolenc et al. | Oct. 19, 1954 |
| 2,754,346 | Williams | July 10, 1956 |

FOREIGN PATENTS

| 1,008,738 | France | May 21, 1952 |
| 78,183 | Netherlands | June 15, 1955 |